United States Patent [19]

Mize et al.

[11] 4,186,239

[45] Jan. 29, 1980

[54] MONOFILAMENT WEED CUTTERS

[75] Inventors: Charles J. Mize; James T. Rumbaugh, both of Spirit Lake, Iowa

[73] Assignee: Berkley & Company, Inc., Spirit Lake, Iowa

[21] Appl. No.: 875,869

[22] Filed: Feb. 7, 1978

Related U.S. Application Data

[63] Continuation of Ser. No. 748,099, Dec. 6, 1976, abandoned.

[51] Int. Cl.² .................. A01D 55/18; D02G 3/00
[52] U.S. Cl. ............................ 428/399; 30/276; 56/12.7; 56/295; 428/397; 428/400
[58] Field of Search .................... 428/399, 400, 397; 30/276, 347; 56/12.7, 29, 295; 172/41, 45

[56] References Cited

U.S. PATENT DOCUMENTS

| | | | |
|---|---|---|---|
| 2,434,533 | 1/1948 | Wurzburger | 57/140 J |
| 3,185,613 | 5/1965 | Adams | 428/399 |
| 3,272,901 | 9/1966 | Sims | 428/400 X |
| 3,388,198 | 6/1968 | Sims | 428/400 X |
| 3,393,083 | 7/1968 | Go | 428/400 X |
| 3,567,569 | 3/1971 | Ono et al. | 428/399 |
| 3,671,381 | 6/1972 | Hansen | 428/400 DR |
| 3,826,068 | 7/1974 | Ballas et al. | 56/295 |
| 3,859,776 | 1/1975 | Ballas et al. | 30/276 |

*Primary Examiner*—Lorraine T. Kendell
*Attorney, Agent, or Firm*—Orrin M. Haugen; Thomas J. Nikolai

[57] ABSTRACT

An improved filament for use in the cutting of weeds and vegetation, wherein the filament is attached at one end to a hub for imparting rotary motion to the filament. The centrifugal force extends the filament radially outwardly from the hub, with the energy of rotation being utilized to sever or cut the vegetation. The filament has a generally centrally disposed axis with an irregular or variant cross-section which fluctuates along the axial length of the filament. The variant cross-section with its fluctuations in cross-sectional area reduce the end or terminal fibrillation of the filament.

3 Claims, 11 Drawing Figures

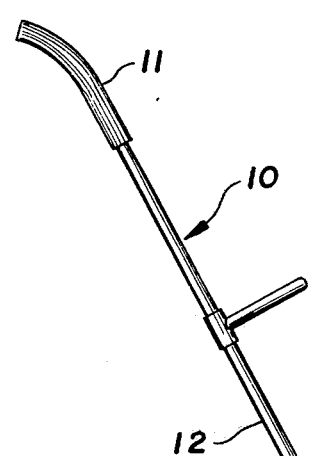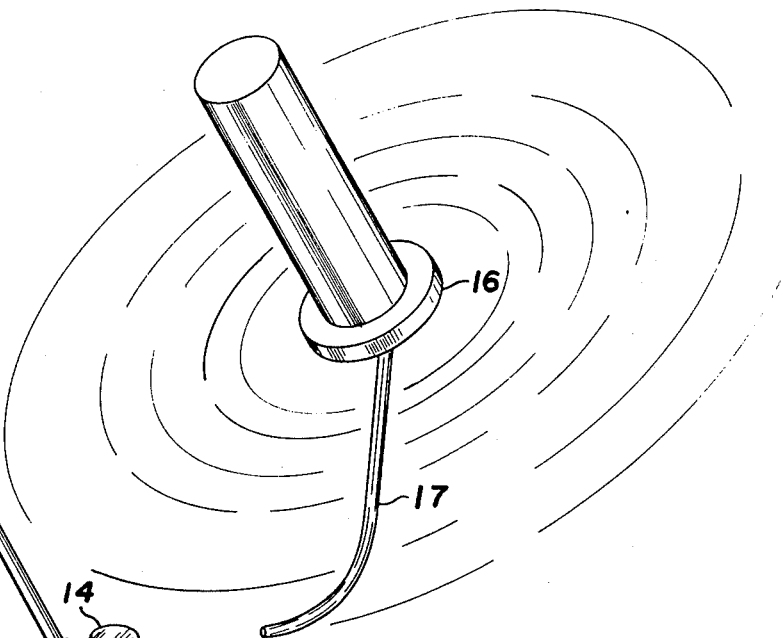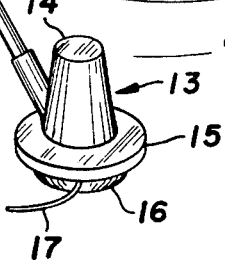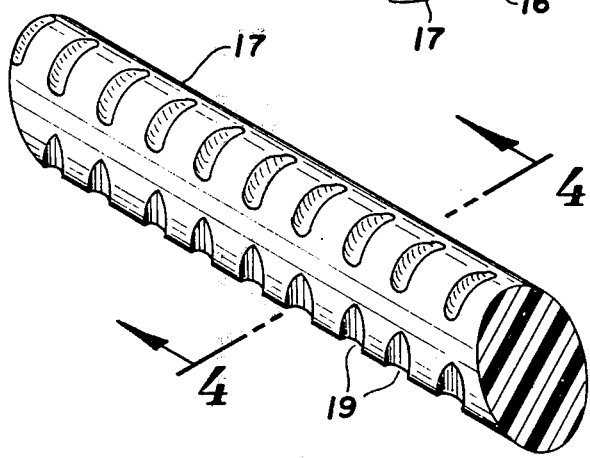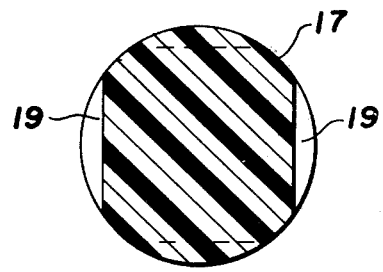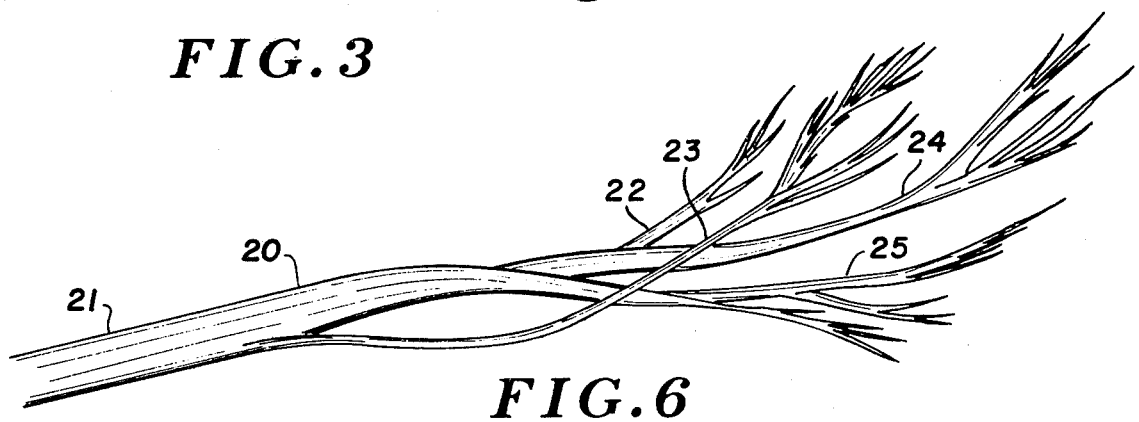

MONOFILAMENT WEED CUTTERS

This is a continuation, of application Ser. No. 748,099, filed Dec. 6, 1976, and now abandoned.

BACKGROUND OF THE INVENTION

The present invention relates generally to an improved filament for use in the rotary cutting of weeds and vegetation, and more particularly to such a filament in which the tendency of the ends to fibrillate is significantly reduced. In particular, the filaments of the present invention have been found to possess extremely long lifetimes when utilized as rotary vegetation cutting members.

The cutting of weeds and trimming of grass and other vegetation has normally been accomplished by the use of metal shears, blades, or rotary powered disks. Hand operated shears tend to render the cutting of weeds and trimming of vegetation to be laborious and tedious, and the utilization of powered shears, blades or powered rotating disks has been dangerous, particularly when these devices are utilized by untrained or unskilled persons who do not appreciate the risks and dangers involved in the usage. While numerous attempts have been made to provide shields or guards about the moving components, such shields or guards have normally been deemed undesirable because of the manner in which they inhibit normal use of the apparatus.

Recently, it has been found that a durable monofilament line, when rotated at high rates of speed provides an efficient and safe means for cutting weeds and natural vegetation, and for trimming grass and the like. Rotational rates in the range of from 2,000 to 20,000 r.p.m. are commonly employed. Typical examples of this type of vegetation cutter are described in U.S. Pat. Nos. 3,985,440; 3,928,911; 3,831,278; 3,693,255; 3,018,602; 3,859,776; and 3,708,967. In each of these devices, a flexible filament is normally employed, preferably a monofilament, however flexible strings, cords and twines have also been suggested.

The filaments utilized for this purpose are essentially filaments having a smooth surface, with the monofilamentary products preferably being oriented polymeric materials such as nylon polyamides or the like. While these devices have normally reduced the risks involved in powered cutting apparatus, the continued utilization of the devices has been found to present problems of cutting efficiency.

Specifically, the ends or end portions of the filamentary materials utilized tend to fibrillate, thereby breaking up into a number of small fibers having limited cross-sectional diameters or areas. Since the energy available for cutting is greatest at the tip of the filament, any reduction in cross-sectional area, and effective mass of the filament correspondingly reduces the ability of the filament to sever the vegetation which it strikes. Normally, the severing action is accomplished by means of abrasion of the stalk of the vegetation through impact.

As has been indicated, the preferred material for the filament is a nylon polyamide material, and particularly monofilaments prepared from nylon 6 (polymerized polycaprolactam). While metallic filaments, in either single or multi-braided form, have been proposed, they were found to be exceedingly dangerous to use because of the normally occurring fracturing of the filament, and ultimate tangential discharge of the resulting metallic fragments or particles. Accordingly, attempts were made to provide safe operation of these structures through the use of braided polymeric filaments, or monofilaments. The problems with braided filaments was essentially that these filaments tended to fibrillate, and upon fibrillation, very little tip cutting action was achieved.

Typically, the monofilaments range in size from about 0.030 up to about 0.125 inches. In the past, these monofilaments, specifically nylon monofilaments, were regular in cross-section, and were normally substantially circular. The surface was relatively smooth, similar to that of monofilament used for a fishing line or similar purposes. However, these nylon monofilaments frequently tended to fibrillate under conditions of heavy use, with the exposed tip end of the filament degenerating into a family of tiny fibrils which decreased the cutting efficiency of the filament. Fracturing or casting-off of the fibrils tended to expose blunt ended material which possessed improved cutting performance, however, this improved performance deteriorated when fibrillation again occurred. Accordingly, overall cutting efficiency was frequently and normally reduced during utilization.

An increase in the tendency toward fibrillation occurs whenever the cutting filament strikes the vegetation at a point spaced from the tip end. While this tendency may be reduced through slow movement of the cutter, it has been found that cutting efficiency and speeds are reduced to an impractically low level when slow movement is utilized.

SUMMARY OF THE INVENTION

Briefly, in accordance with the present invention, cutting filaments of improved efficiency are provided by a reduction of the tendency to fibrillate by providing the filament with an irregular or variant cross-section, the cross-section fluctuating along the axial length of the filament. While the cross-sectional area fluctuations may be formed in a variety of fashions, it has been found preferable to cold form or swedge the pre-formed monofilament so as to distort the otherwise regular configuration along the length of the filament. These distortions provide weak points in the plane of rotation, with the sites thereby serving as "arresting" points which retard or interrupt fibrillation and provide controlled axial fracture points. The fracturing, when provided on such a controlled basis assures a continuous supply of blunt ended filamentary material which has maximum cutting efficiency.

Therefore, it is a primary object of the present invention to provide an improved filamentary material consisting of synthetic resinous material which may be utilized as the cutting filament or severing filament of a rotary vegetation cutter.

It is yet a further object of the present invention to provide an improved monofilamentary member which may be attached at one end to a rotary hub, and which, upon high speed rotation, may be utilized to sever or cut certain vegetation.

It is yet a further object of the present invention to provide an improved filament for use in the rotary cutting of vegetation, with the filament having a generally centrally disposed axis with an irregular or variant cross-section which fluctuates along the axial length of the filament, thereby reducing the tendency of the end or terminal portion of the filament to fibrillate.

Other and further objects of the present invention will become apparent to those skilled in the art upon a study of the following specification, appended claims, and accompanying drawings.

BRIEF DESCRIPTION OF THE DRAWINGS

FIG. 1 is a perspective view of a rotary vegetation cutter, illustrating a rotary cutting head secured to the base of a gripping handle, and with a monofilamentary member extending radially outwardly from the rotary head;

FIG. 2 is a detailed perspective view showing a rotary hub member to which is secured a monofilamentary product fabricated in accordance with the present invention, with FIG. 2 being shown on a slightly enlarged scale;

FIG. 3 is a perspective view of a segment of the monofilamentary member illustrated in FIG. 2, with FIG. 3 showing a fragmentary portion of the filament only and being on a slightly further enlarged scale;

FIG. 4 is a vertical sectional view taken along the line and in the direction of arrows 4—4 of FIG. 3;

FIG. 6 is a perspective view showing the end or terminal portion of a monofilamentary product which has been subjected to high speed rotary motion for the cutting of vegetation, and which has undergone fibrillation;

DESCRIPTION OF THE PREFERRED EMBODIMENT

Figure 5:
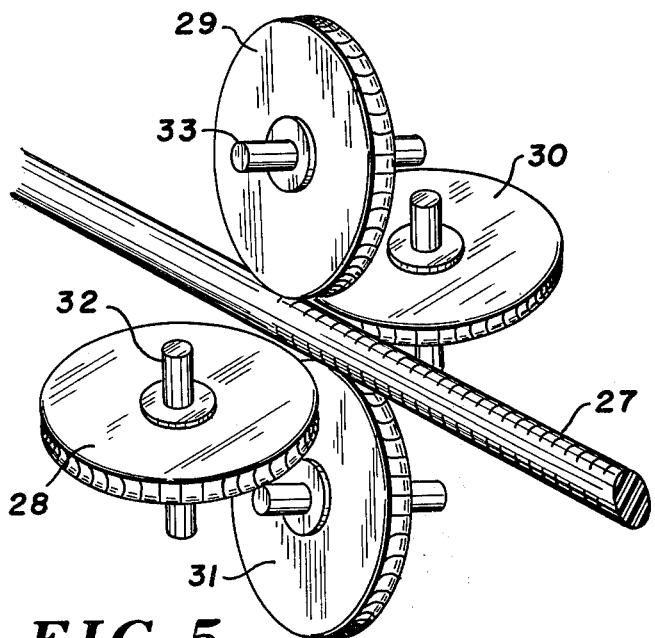
FIG. 5 is a perspective view of an embossing station being utilized to score the surface of the filamentary product, with the retaining means and rotary motion imparting means of the actual station being shown removed for purposes of clarity, with FIG. 5 being again, shown on a slightly enlarged scale.

In accordance with the preferred embodiment of the present invention, and with particular attention being directed to FIGS. 1–6, typical structures of the improved monofilamentary cutting material are illustrated along with an application thereof. In FIG. 1, the rotary cutter device generally designated 10 includes a gripping handle and supporting shaft assembly as shown at 11 and 12 respectively, together with a rotary cutting head 13 secured to the lower free end thereof. The cutting head 13 includes a motor housing 14 which forms a shroud about a motor (not shown) along with a head housing 15. The rotary cutting head is illustrated at 16, to which is attached filamentary cutting member 17. The filamentary cutting member 17, as previously indicated, is preferably a monofilament material, particularly an oriented polymeric monofilament fabricated from nylon 6 or other equivalent nylon. For example, and in addition to oriented nylon 6 monofilament, upon 6/11 copolymers may be utilized, with these copolymers having sufficient stiffness and durability to perform under the circumstances. It will be appreciated, of course, that other synthetic polymers may be employed for fabrication of the monofilament, with other polyamide nylon materials or polyester materials being suitable for the purpose.

The cutting head as illustrated in FIG. 2 as at 16 provides a housing from which monofilament 17 extends radially outwardly. This monofilament has an irregular or variant cross-section which fluctuates along the axial length of the filament, such as is illustrated in detail in FIG. 3. The filament 17 as illustrated in FIG. 3 includes a plurality of indentations providing the variant cross-section. For most purposes, the indentations 19—19 are provided along four separate quadrants, such as at 90°, one to the other, with sets or series of such indentations being arranged at axially spaced locations.

While the precise mechanism for retarding fibrillation is not known, it is believed that it occurs adjacent the tip portion upon repeated impact between the monofilament and the vegetation being severed. Specifically, the impact between the monofilament and the vegetation being severed contributes to the fibrillation as well as the wearing away or abrading of the monofilament. The cutting energy which is available along the length of the monofilament is generally at its maximum at the outer tip, with most of the useful energy being available at that certain outer segment or portion of the filament which extends inwardly from the tip a distance equivalent to approximately 200 times the filament diameter. Those portions or segments of the filament located inwardly from the tip at distances greater than 200 times the filamentary diameter generally have little if any cutting effect. Knots or other irregularities adjacent the end assist in the abrasion, but tend to wear away rapidly and generally require frequent replacement.

As illustrated in FIG. 6, the individual fibrils provide little if any mass which contributes to cutting efficiency. The formation of these fibrils tends to be detrimental to the cutting efficiency because of the resultant reduction in kinetic energy. Furthermore, the fibrils tend to strike the vegetation at a point in time earlier than that point at which contact occurs with the effective mass or central portion of the filament. As a result, the reduction in kinetic energy reduces the ability of the rotating fiber to sever the vegetation. In order to maintain cutting efficiency, reduction or elimination of fibrillation has been found helpful. As has been indicated, the provision of a variant cross-section assists in the reduction of fiber fibrillation.

By way of example and further illustration, the fiber 20 illustrated in FIG. 6 has a main shaft portion as illustrated at 21, together with a plurality of fibrils adjacent the outer free end thereof, such as at 22, 23, 24 and 25. Each fibril tends to have various branched portions disposed adjacent the free end, and thereby tend to contribute to the reduction in cutting efficiency.

In order to prepare the structure illustrated in detail in FIGS. 3 and 4, a conventional oriented nylon monofilament is provided, as illustrated in FIG. 5, as at 27, with a plurality of embossing wheels being illustrated in four equally arcuately spaced locations, these embossing wheels being shown at 28, 29, 30 and 31. Each embossing wheel rotates about an axis, such as the axis of retaining shafts 32 and 33 of wheels 28 and 29 respectively with the remaining wheels being similarly provided with central shafts, the structure of embossing wheels 30 and 31 being identical to that of 28 and 29. As the filament 27 moves in the zone or apex portion defined by the wheels 28–31, the individual indentations are formed therealong, such as has been illustrated at 19—19 in FIG. 3.

In order to better comprehend the various aspects of the present invention, particular attention is directed to the following examples.

EXAMPLE 1

An oriented monofilament of nylon 6 with eliptical cross-section, major axis 0.064 in., minor axis 0.057 in., was drawn through an opening between the four embossing wheels or gears positioned as shown in FIG. 5. All wheels contacted the monofilament so that regular deformations of 0.005 inches were made along the surface spaced at intervals of 0.070 inch. The regularly deformed monofilament formed fibrils an average of 88% shorter than the fibrils of non-deformed monofilament when used to cut similar areas of vegetation. The reduced fibril length and more abrasive surface improved average cutting speed by approximately 60% over the non-deformed cutting element.

EXAMPLE 2

An oriented nylon 6 monofilament of circular cross-section having a diameter of 0.093 inches was subjected to 187° C. and allowed to relax. The monofilament was then deformed as in example 1. No fibrils over 0.030 inch were formed when this monofilament was used as a cutting element for cutting a variety of vegetation.

EXAMPLE 3

An oriented nylon 6/11 copolymer monofilament of eliptical cross-section major axis 0.122 inches, minor axis 0.037 inches was perforated along each edge by removal of an isosceles triangle shaped section of material. The uncommon angle was 30° and the height of each section was approximately 0.020 inches which was the depth of penetration from each opposing edge. The cuts were spaced approximately 0.090 inches apart. The material was then twisted about its longitudinal axis at the rate of one twist/inch and subjected to heat as example 2. The average cutting speed was increased by 37% over a non-deformed, circular cross-sectioned monofilament of 0.065 inch diameter.

EXAMPLE 4

Figure 9:
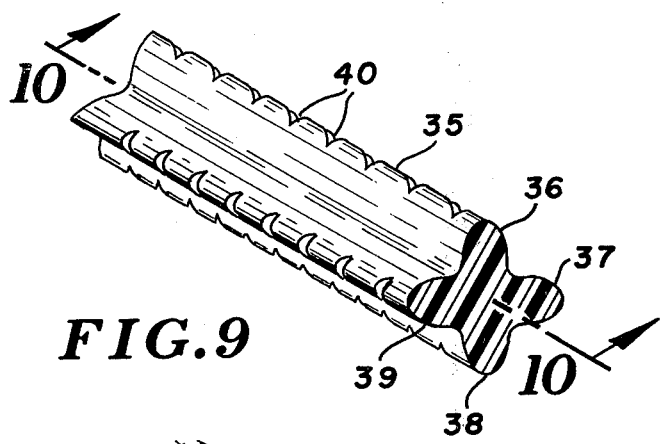
FIG. 9 is a perspective view of a further modified form of monofilament prepared in accordance with the present invention.
Figure 10:
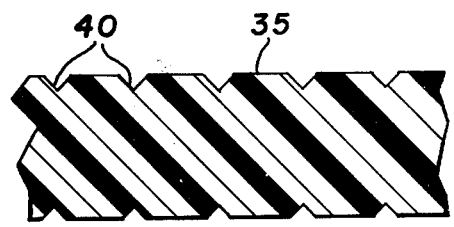
FIG. 10 is a vertical sectional view taken along the line and in the direction of the arrows 10—10 of FIG. 9.
Figure 11:
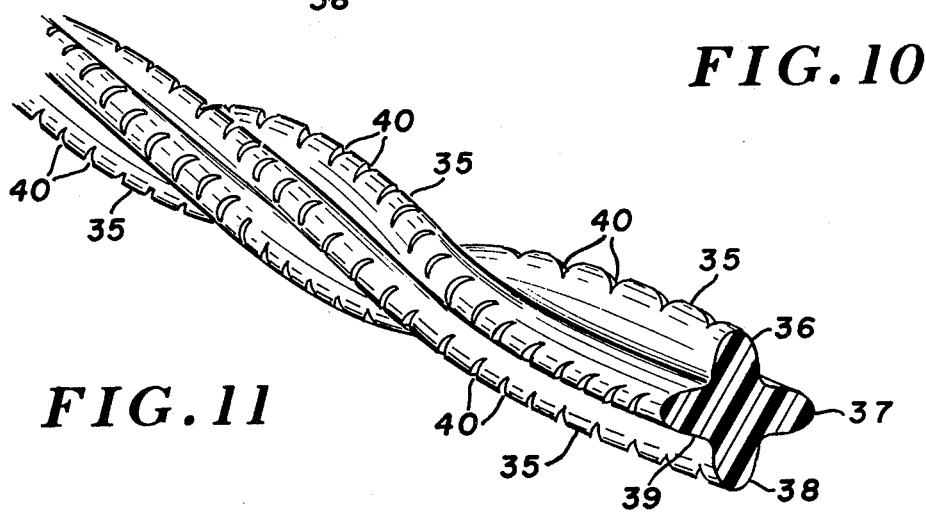
FIG. 11 is a perspective view similar to FIG. 10, but illustrating the configuration of the structure of FIG. 10 after having been twisted upon its central axis.

An oriented nylon 6 monofilament of uniform cross-section as shown in FIG. 9 with dimension D 0.100 inches was moved to between an arrangement of gears such as depicted in FIG. 2. Deformations of approximately 0.003 inches were uniformly spaced along the length of the monofilament of 0.090 inch intervals. Fibrils formed while trimming vegetation averaged less than 0.015 inches in length.

GENERAL DISCUSSION

Figure 7:
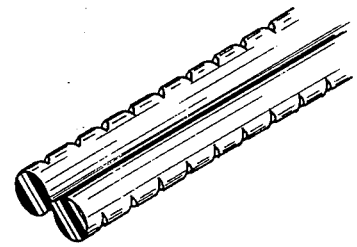
FIGS. 7 and 8 are perspective views of fragmentary portions of modified forms of monofilament fabricated in accordance with the present invention.
Figure 8:
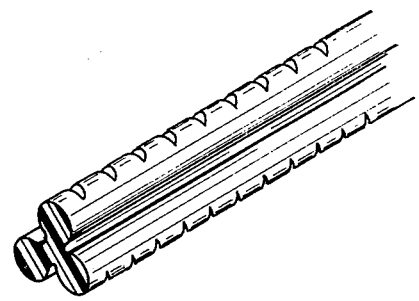

Various modified cross-sectional configurations may be made in addition to those described hereinabove. In addition to circular, eliptical, or triangular cross-sections, dual circular elements such as is illustrated in FIG. 7 may be prepared, as well as the tri-circular configuration illustrated in FIG. 8. Means may be utilized similar to that previously discussed for modifying the surfaces of the structures illustrated in FIGS. 7 and 8.

With particular attention now being directed to FIG. 9, it will be noted that a four-lobe structure is illustrated, with the fragmentary filamentary member 35 being provided with four equally spaced lobes such as at 36, 37, 38 and 39. Each of the lobes carries a series of indentations as at 40—40 along the surface thereof, with these indentations contributing to the reduction and fibrillation.

In still a further modified form, the four-lobe structure of FIG. 9 may be twisted upon its axis so as to provide a multiplicity of leading edges, thereby further contributing to a reduction in fiber fibrillation.

For normal cutting of weeds and the like, it has been found that the cross-sectional area of the filamentary material should be between about $1.5 \times 10^{-2}$ square inches and $7.0 \times 10^{-5}$ square inches. This normally provides sufficient cross-sectional area and mass to be effective.

In the event the filamentary material is not circular in its cross-sectional configuration, then, in that event, the ratio of the filamentary length to the major cross-sectional dimension should be at least about 7. In those instances where a generally regular or circular cross-section is utilized, then, and in that event, the length dimension of the filament should be at least 200 times the cross-sectional diameter.

In order to assist in maintaining an effective mass for the filament, it is preferred that the cross-sectional variations be spaced apart by a distance at least about 0.003 inches. Such a spacing between anomalies will normally be sufficient to maintain fibrillation at a manageable or controllable level.

When the procedure as shown in FIG. 5 is being utilized, and particularly in connection with nylon 6 or nylon 6/11, plastic deformation should occur to an extent equal to between about 1% and 60% of the cross-sectional dimension. Such a plastic flow has been found helpful in retarding fibrillation, and eliminating the adverse effects thereof.

As has been indicated, the utilization of a generally regular cross-section is desired for fabrication purposes, thereby permitting extrusion of the monofilamentary product. Such extrusion, is, of course, commonly practiced in connection with a wide variety of nylon and related filamentary forming materials. The primary feature is the design or provision of an irregular or variant cross-sectional which fluctuates along the axial length of the filament, thereby contributing to a reduction in filamentary fibrillation.

We claim:

1. A weed cutting filament attachable at one end to a rotatable hub, for impact severing of vegetation, the filament comprising:
   (a) an elongated filamentary member having a generally centrally disposed axis and a predetermined substantially constant cross-sectional dimension with indentations formed at spaced intervals along the length thereof, said indentations being formed at spaced apart arcuate and axial dispositions, said indentations being axially spaced by a distance of at least about 0.003 inch.

2. The filamentary vegetation cutter as defined in claim 1 being particularly characterized in that said filament is fabricated from a polyamide nylon selected from the group consisting of nylon 6 and nylon 6/11.

3. The filamentary vegetation cutter as defined in claim 1 being particularly characterized in that the ratio of length to major cross-sectional dimension is at least about 7:1.

* * * * *